(12) United States Patent
Farkas et al.

(10) Patent No.: US 9,781,005 B2
(45) Date of Patent: Oct. 3, 2017

(54) TECHNIQUE FOR ENSURING CONGRUENCY IN LINK AGGREGATION

(71) Applicants: János Farkas, Kecskemét (HU); Balázs Peter Gerö, Budapest (HU); László Molnár, Budapest (HU); Panagiotis Saltsidis, Stockholm (SE)

(72) Inventors: János Farkas, Kecskemét (HU); Balázs Peter Gerö, Budapest (HU); László Molnár, Budapest (HU); Panagiotis Saltsidis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 831 days.

(21) Appl. No.: 13/819,526

(22) PCT Filed: Sep. 21, 2012

(86) PCT No.: PCT/EP2012/003965
§ 371 (c)(1),
(2) Date: Feb. 27, 2013

(87) PCT Pub. No.: WO2013/127416
PCT Pub. Date: Sep. 6, 2013

(65) Prior Publication Data
US 2014/0112191 A1  Apr. 24, 2014

Related U.S. Application Data

(60) Provisional application No. 61/605,818, filed on Mar. 2, 2012.

(51) Int. Cl.
*H04L 12/24* (2006.01)
*H04L 12/709* (2013.01)

(52) U.S. Cl.
CPC ...... *H04L 41/0873* (2013.01); *H04L 41/0853* (2013.01); *H04L 45/245* (2013.01); *Y02B 60/33* (2013.01)

(58) Field of Classification Search
CPC ........................................................ H04L 12/24
(Continued)

(56) References Cited

U.S. PATENT DOCUMENTS 8,054,830 B2 * 11/2011 Jain et al. ............... 370/389
8,160,056 B2 *  4/2012 Van der Merwe et al. .. 370/351
(Continued)

FOREIGN PATENT DOCUMENTS

WO     2012007164 A1     1/2012

OTHER PUBLICATIONS

Farkas, J., "Resilient Network Interconnect Functionalities", Jun. 16, 2010, pp. 1-13, [Retrieved on Jan. 28, 2013], Retrieved from Internet: http://www.ieee802.org/1/files/public/docs2010/new-farkas-network-interconnect-functionalities-0910-v01.pdf.
(Continued)

*Primary Examiner* — Hassan Kizou
*Assistant Examiner* — Abdullahi Ahmed
(74) *Attorney, Agent, or Firm* — Coats & Bennett, PLLC

(57) ABSTRACT

The present disclosure provides a technique for ensuring that a service or conversation is carried in a congruent manner on a Link Aggregation Group (LAG). The Service ID (e.g., conversation ID) to link mapping is configured on both sides of the LAG independently of each other. The Service ID to link assignment is stored in a well-defined format, e.g. in an assignment table. A digest is then prepared on the assignment table. The digest is exchanged between the two sides of the LAG. If there is a mismatch between the digests, then the service is transmitted on a predefined and agreed-upon default link if congruency has to be enforced for that
(Continued)

particular service. Furthermore, the digest exchange allows verification on the configuration to check whether all services to be handed-off are configured on both sides.

25 Claims, 6 Drawing Sheets

(58) Field of Classification Search
USPC .......................................................... 370/254
See application file for complete search history.

(56) References Cited

U.S. PATENT DOCUMENTS

| | | | |
|---|---|---|---|
| 8,839,023 B2* | 9/2014 | Finn et al. ...................... | 714/4.3 |
| 2010/0293408 A1* | 11/2010 | Shannon et al. .................. | 714/4 |
| 2012/0233492 A1* | 9/2012 | Finn et al. ...................... | 714/4.1 |
| 2012/0266013 A1* | 10/2012 | Shannon et al. ............... | 714/4.2 |

OTHER PUBLICATIONS

Interworking Task Group of IEEE 802.1, "Link Aggregation—Amendment: Distributed Resilient Network Interconnect", IEEE P802.1AXbq™/D0.4, Nov. 3, 2011, pp. 1-102, IEEE Standards Department, Piscataway, NJ, USA.

IEEE Computer Society, "IEEE Standard for Local and metropolitan area networks—Link Aggregation", IEEE Std 802.1AX™-2008, Nov. 3, 2008, pp. 1-163, IEEE, NY, USA.

Interworking Task Group of IEEE 802.1, "Draft Standard for Local and Metropolitan Area Networks—Link Aggregation", IEEE P802.1AX-REV™/D0.4, Oct. 5, 2012, pp. 1-188, IEEE Standards Department, Piscataway, NJ, USA.

Rivest, R., "The MD5 Message-Digest Algorithm", Network Working Group, Request for Comments: 1321, Apr. 1, 1992, pp. 1-21, RFC 1321, [Retrieved on Feb. 6, 2013], Retrieved from Internet: http://www.ietf.org/rfc/rfc1321.txt.

Finn, N., "Issues to be discussed on P802.1AXbq D0.3 Distributed Resilient Network Interconnect issues Rev. 1", p. 1-6; [Retrieved on Feb. 6, 2013], Retrieved from Internet: http://www.ieee802.org/1/files/public/docs2011/bq-nfinn-DRNI-issues-0711-v1.pdf.

Finn, N., "Lightweight Network Network Interface Using Link Aggregation Rev. 2", IEEE 802 interim, Jan. 1, 2008, pp. 1-26, [Retrieved on Feb. 14, 2013], Retrieved from Internet: http://www.ieee802.org/1/files/public/docs2010/new-nfinn-light-nni-0710-v02.pdf, IEEE, California, USA.

* cited by examiner

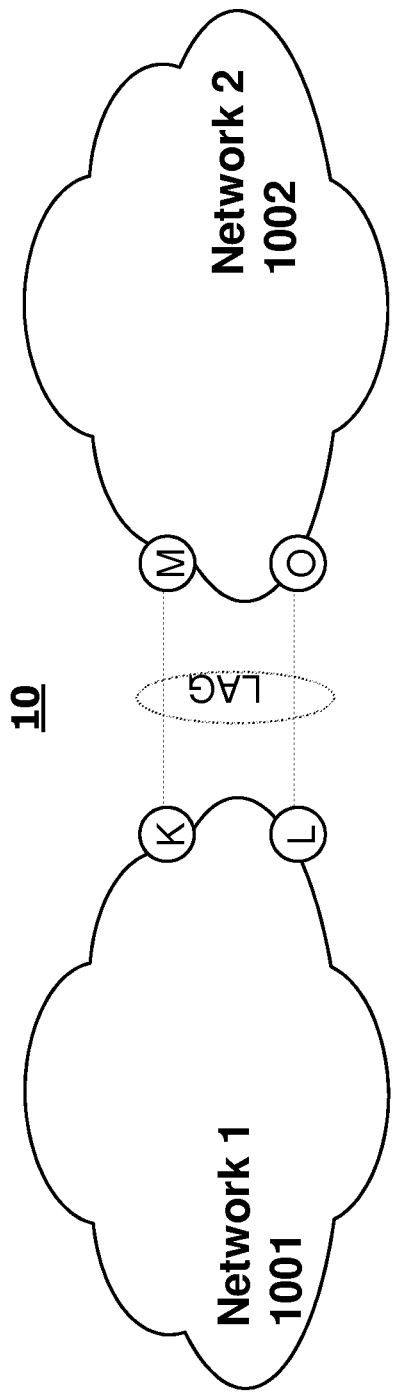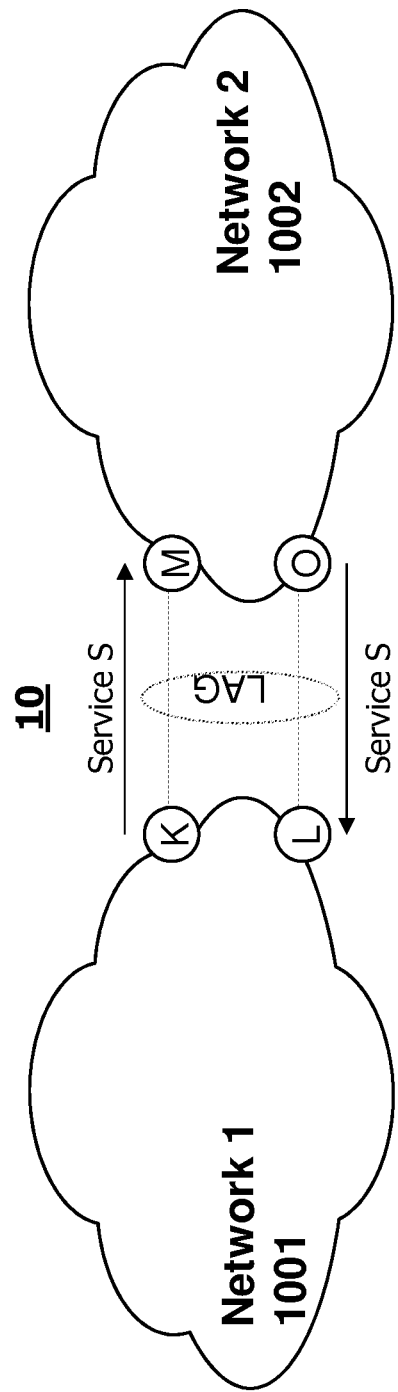

TECHNIQUE FOR ENSURING CONGRUENCY IN LINK AGGREGATION

TECHNICAL FIELD

The present disclosure generally relates to link aggregation, and more particularly relates to a technique for ensuring congruency in link aggregation. The technique may be implemented as a method, as a computer program product or as a network node.

BACKGROUND

Link Aggregation is widely used to aggregate multiple links between a pair of nodes in order to be able to transmit user data on each of the links participating a Link Aggregation Group (LAG) (see, e.g., IEEE 802.1AX). Aggregating multiple network connections in this fashion can increase throughput beyond what a single connection can sustain, and/or can be used to provide redundancy in case of a failure of one of the links. The "Distributed Resilient Network Interconnect" (DRNI) project (see IEEE 802.1AXbq/D0.4) specifies extensions to Link Aggregation in order to be able to use link aggregation on a network interface involving two networks 1001, 1002 even between more than two nodes K, L, M, O, e.g. between four nodes as illustrated in FIG. 1.

The IEEE 802.1AX link aggregation standard does not force the assignment of a conversation to a single physical link. Therefore, the frames of a conversation may be transmitted on two different physical links in the two directions (i.e. the conversation would be considered "non-congruent" on the LAG). In case of a network interface, a conversation could be referred to as a "service," since typically a service is handed-off through the interface. Using LAG for the interface links, it may happen that the service frames (e.g. IP packets) are handed off on one physical link in one direction but handed off on another physical link in the opposite direction, as illustrated in FIG. 2.

Congruent service hand-off, i.e. using the same physical link for frame transmission both in the forward and in the backward directions is highly desirable on a network interface. The service handed-off on an interface may be a Virtual Local Area Network (VLAN). Thus the Service identifier may be a VLAN Identifier (VID), such as a Service VID (i.e. "S-VID") (typically identifying services on Network to Network Interfaces (NNIs)) or a Customer VID (i.e. "C-VID") (typically identifying services on User to Network Interfaces (UNIs)). A VID-to-port mapping has been proposed by N. Finn in the "Issues to be discussed" portion of P802.1AXbq D0.3, Std. contrib. 2011 (http://www.ieee802.org/1/files/public/docs2011/bq-nfinn-DRNI-issues-0711-v1.pdf). This proposal provides a tool to select a physical link for a VID on one side of the nodes connected by the aggregated links. However, there is no means to enforce or even check whether the VID to physical link assignment is the same in both directions, i.e. that the service hand-off is congruent.

SUMMARY

There is a need for facilitating service congruency in a communication network.

In a first aspect, there is provided a method of processing Link Aggregation Group, LAG, link assignments into digests, the LAG link assignments assigning network services to specific LAG links, wherein each LAG link is formed between a local LAG node of a local LAG virtual node in a local network and a corresponding remote LAG node of a remote LAG virtual node in a remote network, wherein the method is implemented in the local LAG node and comprises the steps of obtaining a service assignment table that indicates LAG links of the LAG nodes to which a plurality of services that require LAG congruency are assigned, and preparing, based on the service assignment table, a congruency digest of the local LAG virtual node.

In a first refinement of the first aspect, the method further comprises transmitting the congruency digest from the local LAG node to the corresponding remote LAG node.

In a second refinement of the first aspect, the method further comprises obtaining a non-enforced services table that indicates LAG links of the LAG nodes to which a plurality of services that do not require LAG congruency are assigned, and preparing, based on the non-enforced services table, a non-congruency digest of the local LAG node; and transmitting the non-congruency digest from the local LAG node to the corresponding remote LAG node.

In a third refinement of the first aspect, the method further comprises repeating the obtaining, preparing and transmitting steps responsive to a change in the service assignment.

In a fourth refinement of the first aspect, the obtaining step is based on configured LAG link assignments. Alternatively, the obtaining step is based on a table received from a Network Management System.

In a fifth refinement of the first aspect, the congruency and non-congruency digests each serve as a summary of the respective service assignment table. If so, the congruency and non-congruency digests respectively are calculated by the following step considering the respective service assignment table to contain 4096 consecutive 4*n octet elements, where each element of the table, with the exception of the first and last, contains a series of n link identifiers ordered in highest-to-lowest priority order, each link identifier being a 4-octet binary number constructed by 2-octet Port IDs of its edges having the Port ID of the lower LAG node ID listed first.

In a second aspect, there is provided a method of verification and enforcement of congruent services, wherein a congruency digest has been processed from Link Aggregation Group, LAG, link assignments, the LAG link assignments assigning network services to specific LAG links, wherein a service assignment table indicates LAG links of the local LAG node to which a plurality of services that require LAG congruency are assigned, wherein each LAG link is formed between a local LAG node of a local LAG virtual node in a local network and a corresponding remote LAG node of a remote LAG virtual node in a remote network, wherein the method is implemented in the local LAG node and comprises the steps of receiving a corresponding remote congruency digest from the corresponding remote LAG node; detecting whether the link assignments of the received remote congruency digest and of the local congruency digest match; and if the detecting yields that the link assignments in the local congruency digest and the remote congruency digest do not match, moving all services referenced in the digests to a predefined default LAG link.

In a first refinement of the second aspect, the method further comprises notifying a controller of the detected mismatch.

In a second refinement of the second aspect, a non-congruency digest is prepared based on a non-enforced services table that indicates LAG links of the first LAG node to which a plurality of services that do not require LAG congruency are assigned, further comprising receiving a remote non-congruency digest being prepared based on the non-enforced services table that indicates LAG links of the remote LAG node to which a plurality of services that do not require LAG congruency are assigned; and detecting whether the link assignments of the received remote non-congruency digest and of the local non-congruency digest match. If so, the method further comprises notifying a controller of the detected mismatch.

In a third refinement of the second aspect, the moving step is performed for all services requiring congruency.

In a fourth refinement of the second aspect, the predefined default LAG link is the highest priority physical link among the links available in the LAG.

In a first refinement of the first and second aspects, the steps of transmitting or receiving at least one of the local congruency, local non-congruency, remote congruency and remote non-congruency digests comprise carrying the at least one digest in a subsequent Protocol Data Unit, PDU. If so, the PDU is a Link Aggregation Control PDU, LACPDU. Moreover, in case of a service-handoff from one physical link to another, the PDUs applied for transmission of the digests carry an old digest based on the old configuration setup for the assignment and a new digest representing the new assignment.

In a second refinement of the first and second aspects, the steps of transmitting or receiving at least one of the congruency, non-congruency, remote congruency and remote non-congruency digests comprise carrying the at least one digest in a Continuity Check Message, CCM.

In a third refinement of the first and second aspects, each network service has an ID which is uniquely assigned to a port of the LAG. If so, multiple Service IDs having the same treatment in the LAG may be grouped into a bundle identified by a distinct bundle ID. In the latter case, in preparing the local congruency, local non-congruency, remote congruency and remote non-congruency digests based on the congruency-enforced service table or the non-enforced services table, the congruency-enforced service table or the non-enforced services table further contain the bundle IDs.

In a third aspect, there is provided a computer program product comprising program code portions for performing the method of any one of the preceding claims when the computer program product is executed on one or more computing devices. The computer program product may be stored on a computer readable recording medium.

In a fourth aspect, there is provided a local Link Aggregation Group, LAG, node for processing LAG link assignments into digests, the LAG link assignments assigning network services to specific LAG links, wherein each LAG link is formed between the local LAG node of a local LAG virtual node in a local network and a corresponding remote LAG node of a remote LAG virtual node in a remote network, wherein the local LAG node comprises a processor operably connected to a memory and at least one input/output device, the processor being configured to obtain a service assignment table that indicates LAG links of the LAG nodes to which a plurality of services that require LAG congruency are assigned; and prepare, based on the service assignment table, a congruency digest of the local LAG virtual node.

In a fifth aspect, there is provided a local Link Aggregation Group, LAG, node for verification and enforcement of congruent services, wherein a congruency digest has been processed from LAG link assignments, the LAG link assignments assigning network services to specific LAG links, wherein a service assignment table indicates LAG links of the local LAG node to which a plurality of services that require LAG congruency are assigned, wherein each LAG link is formed between the local LAG node of a local LAG virtual node in a local network and a corresponding remote LAG node of a remote LAG virtual node in a remote network, wherein the local LAG node comprises a processor operably connected to a memory and at least one input/output device, the processor being configured to receive a corresponding remote congruency digest from the corresponding remote LAG node; detect whether the link assignments of the received remote congruency digest and of the local congruency digest match; and if the detecting yields that the link assignments in the local congruency digest and the remote congruency digest do not match, move all services referenced in the digests to a predefined default LAG link.

Of course, the present disclosure is not limited to the above features and advantages. Indeed, those skilled in the art will recognize additional features and advantages upon reading the following detailed description, and upon viewing the accompanying drawings. Moreover, it is to be noted that all features recited as "refinement" of an aspect are merely to be construed as optional features.

BRIEF DESCRIPTION OF THE DRAWINGS

FIG. 1 illustrates a prior art LAG configuration for four nodes.

FIG. 2 illustrates a prior art incongruent LAG service handoff.

DETAILED DESCRIPTION

Figure 3:
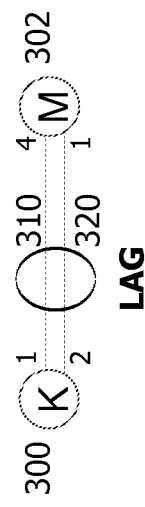
FIG. 3 illustrates a two node LAG network topology.

In the following description, for purposes of explanation and not limitation, specific details are set forth, such as specific device configurations and specific signalling scenarios, in order to provide a thorough understanding of the present disclosure. It will be apparent to one skilled in the art that the technique presented herein may be practiced in other embodiments that depart from these specific details. The skilled artisan will appreciate, for example, that the technique discussed herein may be practiced in combination with standards different from the IEEE standards discussed hereinafter.

Those skilled in the art will further appreciate that the methods, steps and functions explained herein below may be implemented using individual hardware circuitry, using software functioning in conjunction with a programmed microprocessor or a general purpose computer, using one or more Application Specific Integrated Circuits (ASICs), one or more Digital Signal Processors (DSPs), and/or one or more Field Programmable Gate Arrays (FPGAs). It will also be appreciated that the methods, steps and functions disclosed herein may be embodied in a processor and a memory coupled to the processor, wherein the memory stores one or more programs that perform the steps discussed herein when executed by the processor.

The present disclosure provides a technique for ensuring that a service or conversation is carried in a congruent manner on a Link Aggregation Group. The Service ID (conversation ID) to link mapping may be configured on both sides of the LAG independently of each other. The Service ID to link assignment may stored in a well-defined format, e.g. in an assignment table. A digest is then prepared on the assignment table (e.g. a "Congruency Enforcement Digest"). The digest is then exchanged between the two sides of the LAG. If there is a mismatch between the digests, then the service is transmitted on a predefined and agreed-upon default link if congruency has to be enforced for that particular service. Furthermore, the digest exchange allows verification on the configuration to check whether all services to be handed-off are configured on both sides.

Optionally, a service assignment table may also be received for services that do not require LAG congruency, and a secondary digest may be prepared based on this table (e.g. a "Service Verification Digest"). If a mismatch of this secondary digest is detected, the controller will be notified, but the mismatched link assignments of this additional service assignment table will not be moved to the predefined default LAG link. A corresponding apparatus for carrying out this method is also disclosed.

According to one exemplary embodiment, a method of processing Link Aggregation Group (LAG) link assignments that assign network services to specific LAG links is disclosed. Each LAG link is formed between a first LAG node of a first LAG virtual node in a first network and a corresponding second LAG node of a second LAG virtual node in a remote second network. The method is implemented in the first LAG node. According to the method, a service assignment table is obtained that indicates LAG links of the LAG nodes to which a plurality of services that require LAG congruency are assigned. A digest based on the assignment table (e.g. a "Congruency Enforcement Digest") is transmitted from each first LAG node to the corresponding second LAG node with which it forms a LAG link. Additionally, each first LAG node receives a corresponding digest from its corresponding second LAG node that is based on the link assignments of the second LAG virtual node. Responsive to detecting that the link assignments of the received and transmitted digests do not match, all services referenced in the digest are moved to a predefined default LAG link, and a controller (e.g. a Network Management System network node) is notified of the detected mismatch.

One non-limiting advantage of the inventive method is that it ensures that a service or conversation is handed off in a congruent manner in a LAG group if it is required. Thus, the disclosed method extends Link Aggregation so that a particular physical link may be selected for a given service, to enforce congruency. Furthermore, this method provides alarms to the management system in case of misconfiguration in the service hand-off. This method to enforce congruency and to verify service ID configuration in LAG is described in greater detail below. In some embodiments, bundling may also be applied for the services handed-off, i.e. multiple services having common treatment may be grouped into a bundle.

Figure 4:
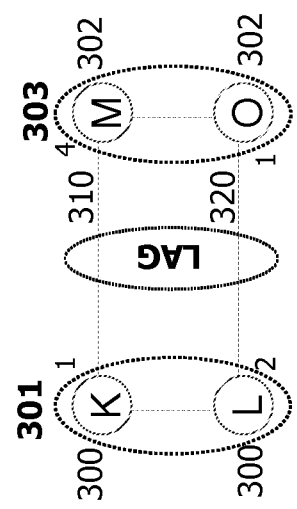
FIG. 4 illustrates a four node LAG network topology.

FIG. 3 illustrates a two-node LAG network topology including LAG nodes K 300 and M 302, with two LAG links (1-4 and 2-1) 310, 320 being aggregated between the nodes. FIG. 4, however, illustrates four nodes K and L 301, and M and O 302. In this context, K and L may be collectively considered a "LAG virtual node" 301 but individually considered "LAG nodes." Similarly, nodes M and O may collectively be considered a "LAG virtual node" 302 but individually considered "LAG nodes."

The methods described here assumes that a Service ID can be assigned to a port, i.e. to a physical link 310, 320 participating in a LAG, by means of configuration (e.g. to the K-M links of FIG. 3, or the K-M and L-O links of FIG. 4). For the proper operation of link aggregation, port identifiers should be uniquely assigned on one side of the LAG, i.e. within a node (e.g. LAG node K in FIG. 3) or along all nodes participating on the same side of the LAG in case of multiple nodes (e.g. LAG nodes K and L in FIG. 4). A physical link can be identified by the IDs of the ports it connects such that the port ID of the node having the lower numerical ID is listed first. Applying this naming scheme to FIGS. 3-4, the ID of the upper link is 1-4 and the ID of the lower link is 2-1. Note that if more than two LAG nodes are connected by the LAG (not shown in the figures), then the lowest ID could be determined on one side of the LAG and then these two lowest node IDs of the two sides are compared when determining the link ID.

Assignment Tables

Having the service IDs assigned to physical links, a table can be determined on the assignment. In one example the LAG nodes prepare the table based on the configured assignments. In another example the table is received from another entity, such as the Network Management System (NMS) 400-1, 400-2 (see FIG. 6). There are two different types of behaviors that can be distinguished based on the service attributes: services for which congruency has to be enforced, and services for which congruency enforcement is not required. Due to the significant difference in the required behavior, two service to link assignment tables may be maintained as illustrated by Table 1 and Table 2, for the example two-link topology of FIGS. 3-4.

The first table is the "Congruency Enforced Service to Link Assignment table" (Table 1), which lists all the service ID to link ID assignments for all the services requiring congruency enforcement. The second table (Table 2) contains the "Non-enforced Services," which is a list of all of the rest of the services, i.e. the services not requiring congruency enforcement. Table 2 also includes the services that are basically handed-off in a congruent manner but may nevertheless fall back to non-congruent hand-off. Alternatively, the Non-enforced Services table might involve all the Service IDs handed-off, which would give a redundancy between the two tables, but would result in the same operation behaviors.

A LAG provides link protection for the service hand-off, i.e. if an "Active" link goes down, then another "Standby" one takes over. In order to provide congruency, the Service ID to link assignment contains each physical link in priority order for all the services as illustrated in Table 1. (Note that Table 1 shows an example for a 2-link LAG case, e.g. the ones illustrated in FIGS. 3-4. If there are more than two links in the LAG, then each link may have its own column in the Congruency Enforced Service to Link Assignment table, e.g. Highest priority link, Second Highest priority link, . . . , Lowest priority link.) As will be described below in greater detail, if both LAG nodes determine that they have the same link assignment for a given service, then that assignment is implemented (e.g. both sides switch to the same physical link after a change in the status of the link). Otherwise, if there is a mismatch in the links, a default link may be used.

TABLE 1

Congruency Enforced Service to Link Assignment

| Service | High priority link | Low priority link |
|---|---|---|
| 1001 | 1-4 | 2-1 |
| 2002 | 1-4 | 2-1 |
| 3013 | 2-1 | 1-4 |
| 3067 | 2-1 | 1-4 |
| 3333 | 2-1 | 1-4 |
| 3555 | 2-1 | 1-4 |
| 3777 | 2-1 | 1-4 |
| 4004 | 1-4 | 2-1 |
| 4018 | 1-4 | 2-1 |
| 4034 | 1-4 | 2-1 |

TABLE 2

Non-enforced Services

| Service |
|---|
| 16 |
| 24 |
| 124 |
| 1011 |
| 2099 |
| 4001 |

In order to be able to compare the tables of the two sides, the tables should have a well-defined format. For example the Non-enforced Services table (Table 2) should list the services in numerical order of their ID as illustrated in Table 2. Similar principle can be applied for the Congruency Enforced Service to Link Assignment table as well. That is, the rows of the table are given by the numerical order of the Service IDs. Within a row corresponding to a particular service, the link IDs are listed according to their priority order, as illustrated in Table 1.

Figure 7:
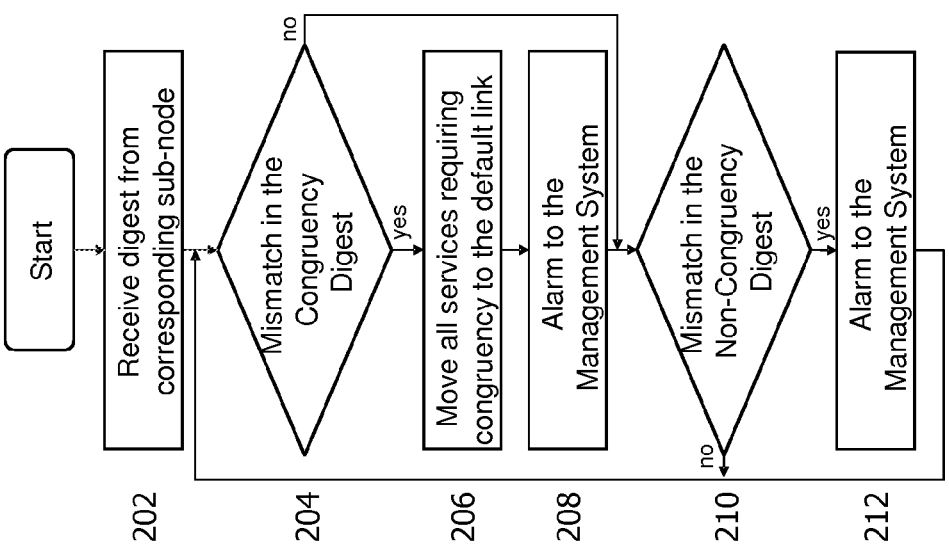
FIG. 7 illustrates a method of handling detected service assignment mismatches.

The congruency enforcement method 200 of FIG. 7 checks the equivalence of the tables at the two sides of LAG (e.g. tables at LAG virtual node KL and LAG virtual node MO) and performs the proper action in case of a mismatch. Digests The matching of the assignment is periodically checked based on an exchange mechanism between the two sides of the LAG. The periodic exchange of the entire tables for the verification of their match would consume too much bandwidth. Therefore, a well-defined digest may be exchanged instead of an entire table.

As there are two types of assignment tables, two types of digests are distinguished. The "Congruency Enforcement Digest" is computed on the Congruency Enforced Service to Link Assignment table (Table 1), and the "Service Verification Digest" is computed on the Non-enforced Services table (Table 2).

The digest, for example, can be computed by creating a 16 octet MD5 signature (see IETF RFC 1321). The digest then serves as a summary of the table from which it is created. To calculate the digest, the Congruency Enforced Service to Link Assignment table is considered to contain 4096 consecutive 4*n octet elements, where each element of the table (with the exception of the first and last) contains a series of n link identifiers ordered in highest-to-lowest priority order. Each link identifier being a 4-octet binary number constructed by the 2-octet Port IDs of its edges having the Port ID of the lower Node ID listed first. The first element of the table contains the value 0, the second element the Link ID series values corresponding to Service 1 or 0 if Service 1 is not in the table, the third element the Link ID series values corresponding to Service 2 or 0 if Service 2 is not in the table, and so on, with the next to last element of the table containing the Link ID series values corresponding to Service 4094 or 0 if Service 4094 is not in the table, and the last element containing the value 0. An example key used to generate the signature could be the 16-octet string 0x13AC06A62E47FD51F95D2BA243CD0346.

Figure 5:
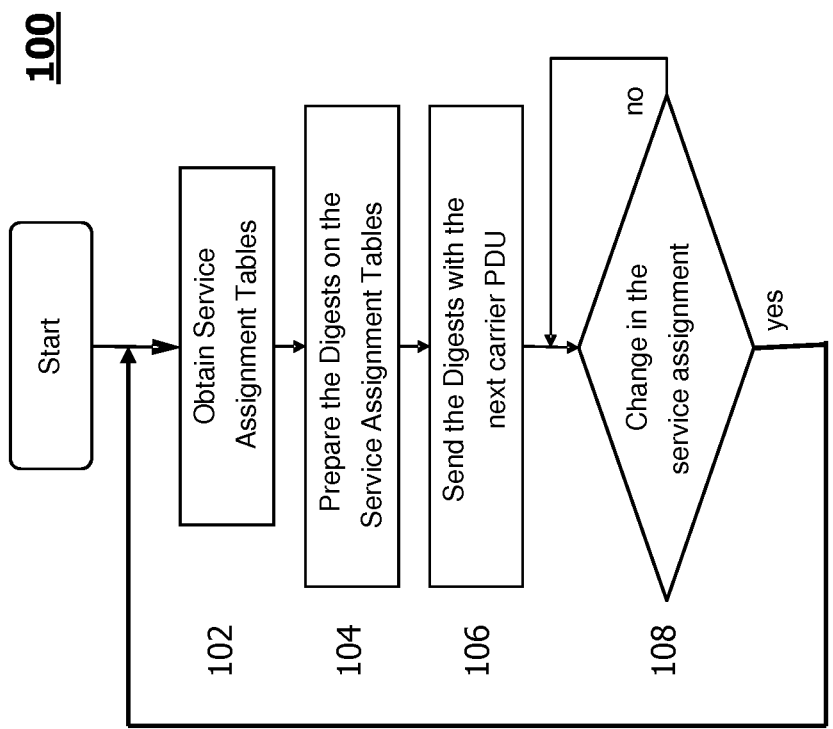
FIG. 5 illustrates a congruency method of processing service assignments.

FIG. 5 illustrates an exemplary method 100 of processing service assignments into the digests discussed above. According to the method, the service assignment table(s) are obtained (step 102). As discussed above, this may include obtaining the tables from the NMS 400-1, 400-2 of FIG. 6. For example, LAG nodes K and L could obtain the Congruency Enforced Service to Link Assignment table (Table 1) from NMS1 400-1, and similarly LAG nodes M and O could obtain their version of the table from NMS2 400-2. Optionally, the LAG nodes could also receive the Non-enforced Services table (Table 2). Based on the congruency table, at least one LAG node on each side of the LAG links prepares a "Congruency Enforcement Digest" as discussed above (step 104). Thus, LAG nodes K and L could each perform step 104, or one of LAG nodes K and L could perform step 104 to determine the digest and could then send the digest to the other of the LAG nodes K and L. If the Non-enforced Services table (Table 2) is obtained, step 104 may include determining a corresponding "Service Verification Digest." Although receipt of the "Non-enforced Services" table and creation of a digest based upon it is described below, it is understood that this is an optional feature.

Each LAG node sends its digests to its associated LAG node with which it forms a LAG link, so LAG nodes K and M exchange digests and LAG nodes L and O exchange digests (step 106). The digests may be transmitted along with a subsequent Protocol Data Unit (e.g. a Link Aggregation Control Protocol Data Unit). Responsive to a change in the service assignment (step 108), steps 102-106 are repeated.

Thus, as described above, each side of the LAG performs the steps depicted in FIG. 5, and in case of a change in the service (conversation) to physical link assignment, the Service Assignment Tables are updated. The new digests are then computed and sent to the peer. Note that the digests are carried by PDUs which are periodically exchanged.

Digests represent desired service configurations, which do not change in case of faults, i.e. digests do not change during fault conditions even though services may be handed off on different links.
Exchange LAG peers periodically exchange the Congruency Enforcement Digest and the Service Verification Digest in order to be able to detect a mismatch. There may be different Protocol Data Units (PDUs) that are suitable for carrying the digests. For example, the PDUs of the Link Aggregation Control Protocol (LACP) are suitable to carry the digest. Besides LACPDUs, Continuity Check Messages (CCM) might be also applied for the monitoring of the status of the physical links. CCMs are also suitable to carry the digest.

Figure 6:
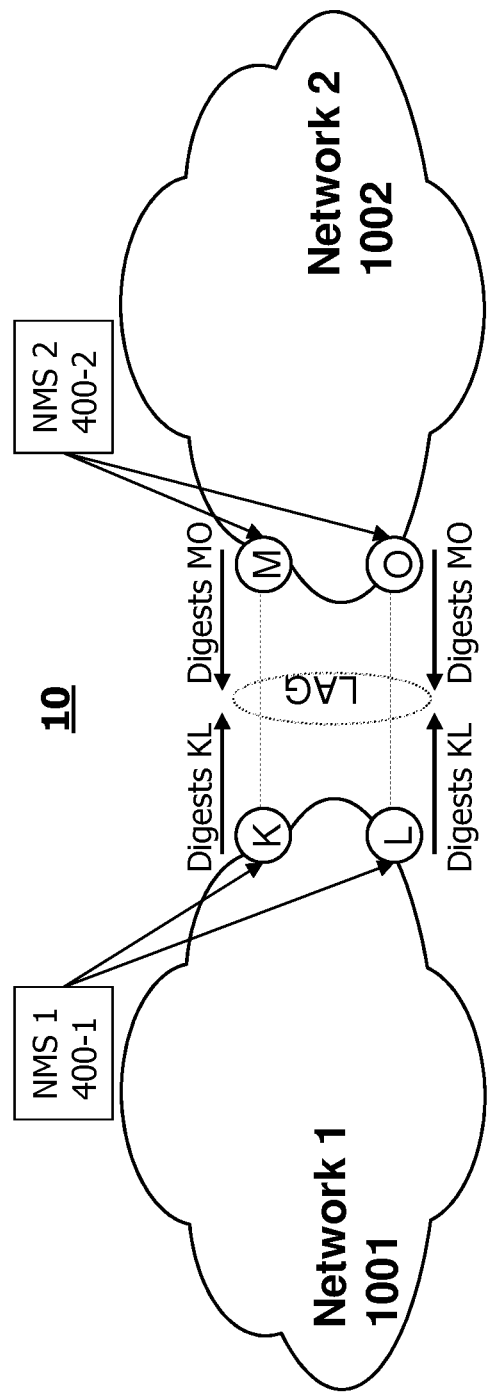
FIG. 6 schematically illustrates the transfer of digests between corresponding LAG nodes.

FIG. 6 illustrates the configuration of service-to-link assignments and the exchange of the digests. For example, at service hand-off initiation, the NMS 400-1, 400-2 of each network consistently configures the service-to-link assignment in the nodes participating in the LAG of its own network. For example, NMS1 400-1 consistently configures LAG nodes K and L; NMS2 400-2 consistently configures LAG nodes M and O in FIG. 6. The digests are then the same for the LAG virtual nodes of a network i.e. for the LAG nodes on one side of the LAG, e.g. LAG nodes K and L send Digests KL. Therefore, one side always sends the same digests on each physical links participating in the LAG.

If there is a change in the service to link assignment, then the method of FIG. 5 is invoked on the node where the assignment has been changed.

Verification and Enforcement

Different actions are taken in case of the mismatch of the different digests, and this is illustrated by the method 200 of FIG. 7. Once digests are received from peer LAG nodes (step 202), a check is performed to determine if there is a mismatch in the congruency digest, also sometimes referred to as congruency enforcement digest (step 204). If there is a mismatch in the non-congruency digest (or "service verification digest"), then the LAG nodes know that at least one of the services in the table is not being implemented congruently.

If the operators of the respective networks (i.e. Network 1 and Network 2) agree a priori that they want to enforce the congruency, then action must be taken. Because the digest does not provide details on which services do not meet the congruency requirement, a congruency enforcement action may be taken for all of the services requiring congruency.

Thus, in order to be able to enforce congruency, an unambiguous default link is used on which all the services can be carried that require congruency in case of a configuration mismatch. In one example, the default link is the highest priority physical link among the links available in LAG, i.e. the physical link having the numerically lowest ID. With this in mind, congruency is enforced by moving all the services to the default link in case of a misconfiguration (step 206), and an alarm signal is sent to the NMS indicating the detected mismatch for services requiring congruency (step 208).

This notification can be understood as indicating that peering LAG nodes (i.e. LAG nodes that are peers through a link between to LAG virtual nodes, such as LAG nodes K and M) have a different set of services configured to be handed-off in a non-congruent manner.

If the non-enforced services table (Table 2) and the "non-congruency digest" (or "Service Verification Digest") are also being used, then a check may be performed to detect a mismatch in those exchanged digests (step 210). If a mismatch is detected, the NMS is similarly notified (step 212).

The steps of FIG. 7 are performed in each LAG node participating in the LAG individually. For instance it is invoked in all nodes K, L, M and O in FIG. 6 for detected mismatches.

Bundling

Bundling may be applied for the service hand off in the LAG for better scalability. That is, multiple Service IDs having the same treatment in the LAG may be grouped into a bundle identified by a distinct Bundle ID. Therefore, the assignment tables have to be extended with Bundle IDs if bundling is applied as illustrated in Table 3 and Table 4. In both tables, the Bundle ID is given in each row right after the Service ID as illustrated in the tables.

TABLE 3

Congruency Enforced Service to Link Assignment with bundles

| Service | Bundle | Highest priority link | Lowest priority link |
|---|---|---|---|
| 1001 | 1 | 1-4 | 2-1 |
| 2002 | 1 | 1-4 | 2-1 |
| 3013 | 2 | 2-1 | 1-4 |
| 3067 | 2 | 2-1 | 1-4 |

TABLE 3-continued

Congruency Enforced Service to Link Assignment with bundles

| Service | Bundle | Highest priority link | Lowest priority link |
|---|---|---|---|
| 3333 | 2 | 2-1 | 1-4 |
| 3555 | 2 | 2-1 | 1-4 |
| 3777 | 2 | 2-1 | 1-4 |
| 4004 | 1 | 1-4 | 2-1 |
| 4018 | 1 | 1-4 | 2-1 |
| 4034 | 1 | 1-4 | 2-1 |

TABLE 4

Non-enforced Services with bundles

| Service | Bundle |
|---|---|
| 16 | 3 |
| 24 | 4 |
| 124 | 4 |
| 1011 | 3 |
| 2099 | 3 |
| 4001 | 4 |

There might be alternative table formats applied for the service assignment tables, e.g. the one shown in Table 5 for the Congruency Enforced Service to Link Assignment with bundles. The key point is that the same format is applied on the two sides of the LAG thus the digests are computed on the same tables.

TABLE 5

An alternative Congruency Enforced Service to Link Assignment with bundles

| Bundle | Highest priority link | Lowest priority link | Service List |
|---|---|---|---|
| 1 | 1-4 | 2-1 | 1001, 2002, 4004, 4018, 4034 |
| 2 | 2-1 | 1-4 | 3013, 3067, 3333, 3555, 3777 |

The digests are then computed on the tables containing the Bundle IDs if bundling is applied. Having the digests, the operation is the same for the bundling case as described above for the non-bundling case.

Migration

Introduction, removal or movement of a service hand-off from one physical link to another should not cause any disruption for other services. Therefore, the PDUs applied for the transmission of digests carry two digests in case of such a transient. One of the digests is referred to as "Old Digest," which is determined based on the old configuration set-up for service to link or to bundle assignment. The other digest is referred to as "New Digest," which represents the new service-to-link or to-bundle assignment. Misconfiguration is not declared, and therefore no action is taken if the local Old Digest or the local New Digest matches either of the remote Old Digest or New Digest received in a PDU. That is, the hand-off of the ongoing services (i.e. the transfer of a received packet or "frame" to its corresponding LAG entity) is not disrupted if a new service is introduced, a service is removed or moved from one link to the other. It is only the service being configured (or re-configured) that may suffer some disruption until it is properly configured on both sides of the interface. As configuration may take a while, it is beneficial to include both digests in the PDUs exchanged for a significant amount of time (e.g. in the order of ten minutes) even if the reconfiguration has been finished. That is, if one side starts the reconfiguration process, then it keeps sending the Old Digest and immediately incorporates the New Digest according to the new service hand-off set-up agreed with the peering partner.

After finishing the reconfiguration, a timer is started and both digests are incorporated in the PDUs until the timer is running.

Figure 8:
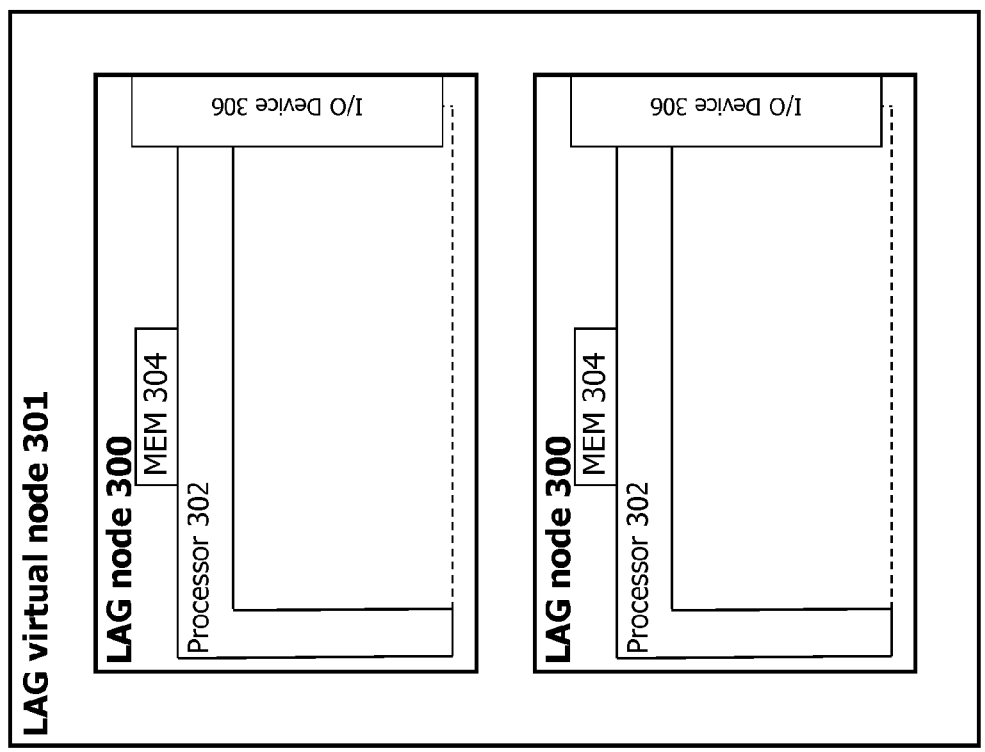
FIG. 8 illustrates an exemplary LAG node.

Referring to FIG. 8, an example LAG node 300 is illustrated. The LAG node 300 includes a processor 302 operable to implement the methods 100, 200. The processor 302 is operatively connected to memory 304 and at least one input/output device 306 for communicating with its associated LAG node (within the same LAG virtual node 301), and with its corresponding other LAG node (in the remote other LAG virtual node 302). Thus, the I/O device 306 helps LAG node K communicate with LAG node L and LAG virtual node MO. The memory 304 may be used to store the digests and link assignments discussed above, for example. The processor 302 may be implemented by one or more microprocessors, hardware, firmware, or a combination thereof, for example.

Thus, the foregoing description and the accompanying drawings represent non-limiting examples of the methods and apparatus taught herein. As such, the present disclosure is not limited by the foregoing description and accompanying drawings.

The invention claimed is:

1. A method of processing Link Aggregation Group (LAG) link assignments into digests, the LAG link assignments assigning network services to specific LAG links, wherein each LAG link is formed between a local LAG node of a local LAG virtual node in a local network and a corresponding remote LAG node of a remote LAG virtual node in a remote network, wherein the method is implemented in the local LAG node and comprises:
   obtaining an enforced service assignment table that indicates LAG links of the LAG nodes to which a plurality of services that require LAG congruency are assigned and for which LAG congruency is enforced; and
   preparing, based on the enforced service assignment table, a congruency digest of the local LAG virtual node.

2. The method of claim 1, further comprising transmitting the congruency digest from the local LAG node to the corresponding remote LAG node.

3. The method of claim 2, further comprising repeating the obtaining, the preparing, and the transmitting responsive to a change in the service assignment.

4. The method of claim 2, further comprising:
   obtaining a non-enforced service assignment table, distinct from the enforced service assignment table, that indicates LAG links of the LAG nodes to which a plurality of services that do not require LAG congruency are assigned;
   preparing, based on the non-enforced service assignment table, a non-congruency digest of the local LAG node; and
   transmitting the non-congruency digest from the local LAG node to the corresponding remote LAG node.

5. The method of claim 4, wherein the congruency and non-congruency digests each serve as a summary of the respective service assignment table.

6. The method of claim 5, wherein the congruency and non-congruency digests are both prepared by considering the respective service assignment table to contain 4096 consecutive 4*n octet elements, where each element of the table, with the exception of the first and last, contains a series of n link identifiers ordered in highest-to-lowest priority order, each link identifier being a 4-octet binary number constructed by 2-octet Port IDs of its edges having the Port ID of the lower LAG node ID listed first.

7. The method of claim 1, wherein the obtaining is based on configured LAG link assignments.

8. The method of claim 1, wherein the obtaining is based on a table received from a Network Management System.

9. The method of claim 4, wherein at least one of the transmitting the congruency digest and transmitting the non-congruency digests comprises carrying the corresponding digest in a subsequent Protocol Data Unit (PDU).

10. The method of claim 9, wherein the PDU is a Link Aggregation Control PDU (LACPDU).

11. The method of claim 9, wherein, in case of a service-handoff from one physical link to another, the PDUs applied for transmission of the digests carry an old digest based on an old configuration setup for the assignment and a new digest representing a new assignment.

12. The method of claim 4, wherein at least one of the transmitting the congruency digest and transmitting the non-congruency digests comprises carrying the at least one digest in a Continuity Check Message.

13. The method of claim 1, wherein each network service has an ID which is uniquely assigned to a port of the LAG.

14. The method of claim 13, wherein multiple Service IDs having the same treatment in the LAG are grouped into a bundle identified by a distinct bundle ID.

15. The method of claim 14, wherein preparing the congruency digest of the local LAG virtual node comprises preparing the congruency digest of the local LAG virtual node based on the enforced service assignment table, with the enforced service assignment table containing bundle IDs.

16. The method of claim 4, wherein preparing the non-congruency digest of the local LAG virtual node comprises preparing the non-congruency digest of the local LAG virtual node based on the non-enforced services table, with the non-enforced services table containing bundle IDs.

17. A method of verification and enforcement of congruent services, wherein a congruency digest has been processed from Link Aggregation Group (LAG) link assignments, the LAG link assignments assigning network services to specific LAG links, wherein a service assignment table indicates LAG links of the local LAG node to which a plurality of services that require LAG congruency are assigned, wherein each LAG link is formed between a local LAG node of a local LAG virtual node in a local network and a corresponding remote LAG node of a remote LAG virtual node in a remote network, wherein the method is implemented in the local LAG node and comprises:
   receiving a remote congruency digest from the corresponding remote LAG node;
   detecting whether the link assignments of the received remote congruency digest and of a local congruency digest match; and
   moving, if the detecting indicates that the link assignments in the local congruency digest and the remote congruency digest do not match, all services referenced in the digests to a predefined default LAG link.

18. The method of claim 17, further comprising notifying a controller of a detected mismatch.

19. The method of claim 17, wherein a non-congruency digest is prepared based on a non-enforced services table that indicates LAG links of the local LAG node to which a plurality of services that do not require LAG congruency are assigned, the method further comprising:
- receiving a remote non-congruency digest prepared based on the non-enforced services table that indicates LAG links of the remote LAG node to which a plurality of services that do not require LAG congruency are assigned; and
- detecting whether the link assignments of the received remote non-congruency digest and of a local non-congruency digest match.

20. The method of claim 19, further comprising notifying a controller of the detected mismatch between the link assignments of the local and remote non-congruency digests.

21. The method of claim 17, wherein the moving is performed for all services requiring congruency.

22. The method of claim 17, wherein the predefined default LAG link is the highest priority physical link among the links available in the LAG.

23. A non-transitory computer readable medium storing a computer program product for processing Link Aggregation Group (LAG) link assignments into digests, the LAG link assignments assigning network services to specific LAG links, wherein each LAG link is formed between a local LAG node of a local LAG virtual node in a local network and a corresponding remote LAG node of a remote LAG virtual node in a remote network, the computer program product comprising software instructions which, when run on one or more computing devices of the local LAG node, causes the local LAG node to:
- obtain an enforced service assignment table that indicates LAG links of the LAG nodes to which a plurality of services that require LAG congruency are assigned and for which LAG congruency is enforced; and
- prepare, based on the enforced service assignment table, a congruency digest of the local LAG virtual node.

24. A local Link Aggregation Group (LAG) node for processing LAG link assignments into digests, the LAG link assignments assigning network services to specific LAG links, wherein each LAG link is formed between the local LAG node of a local LAG virtual node in a local network and a corresponding remote LAG node of a remote LAG virtual node in a remote network, wherein the local LAG node comprises:
- a processor operably connected to memory;
- at least one input/output device;
- wherein the processor is configured to:
  - obtain, via the input/output device, an enforced service assignment table that indicates LAG links of the LAG nodes to which a plurality of services that require LAG congruency are assigned and for which LAG congruency is enforced; and
  - prepare, based on the enforced service assignment table, a congruency digest of the local LAG virtual node.

25. A local Link Aggregation Group (LAG) node for verification and enforcement of congruent services, wherein a congruency digest has been processed from LAG link assignments, the LAG link assignments assigning network services to specific LAG links, wherein a service assignment table indicates LAG links of the local LAG node to which a plurality of services that require LAG congruency are assigned, wherein each LAG link is formed between the local LAG node of a local LAG virtual node in a local network and a corresponding remote LAG node of a remote LAG virtual node in a remote network, wherein the local LAG node comprises:
- a processor operably connected to memory;
- at least one input/output device;
- wherein the processor is configured to:
  - receive, via the input/output device, a remote congruency digest from a corresponding remote LAG node;
  - detect whether the link assignments of the received remote congruency digest and of the local congruency digest match; and
  - move, if the detecting indicates that the link assignments in the local congruency digest and the remote congruency digest do not match, all services referenced in the digests to a predefined default LAG link.

* * * * *